Oct. 27, 1970   A. WINKLER ET AL   3,536,387
MOTION PICTURE CAMERA
Filed March 6, 1968

INVENTOR.
ALFRED WINKLER
JOHANN ZANNER
KARL NEUDECKER

BY Michael S. Striker
   A. Horney
   Attorney

United States Patent Office
3,536,387
Patented Oct. 27, 1970

3,536,387
MOTION PICTURE CAMERA
Alfred Winkler, Munich, Johann Zanner, Unterhaching, near Munich, and Karl Neudecker, Munich, Germany, assignors to Agfa-Gavaert Aktiengesellschaft, Leverkusen, Germany
Filed Mar. 6, 1968, Ser. No. 710,866
Claims priority, application Germany, Mar. 18, 1967, A 27,393
Int. Cl. G03b 23/02
U.S. Cl. 352—72    14 Claims

ABSTRACT OF THE DISCLOSURE

A motion picture camera wherein the film transporting mechanism shifts an indicator into registry with a window in the view finder in response to insertion of a magazine into the housing. The indicator is coupled with the film transporting mechanism and moves with reference to the window when the mechanism transports the film from the supply reel toward the takeup reel in the inserted magazine. The indicator further serves to operate a film frame counter.

BACKGROUND OF THE INVENTION

The present invention relates to motion picture cameras in general, and more particularly to improvements in motion picture cameras which can use removable film-containing magazines.

Certain high-priced motion picture cameras are provided with automatic devices which indicate that the supply of unexposed film is exhausted. Such devices can track the film during travel from the supply reel toward the takeup reel to produce visible or otherwise detectable signals when the supply of film on the supply reel is nearly exhausted. Such types of indicating devices are too expensive for popularly priced amateur motion picture cameras which utilize 8-millimeter film.

SUMMARY OF THE INVENTION

It is an object of our invention to provide a simple, compact and inexpensive indicator assembly which can be installed in a motion picture camera to indicate the presence or absence of a film magazine as well as to indicate whether or not the film transporting mechanism is in operation.

Another object of the invention is to provide an indicator assembly which can also serve as a means for operating the film frame counter in a motion picture camera.

A further object of the invention is to provide an indicator assembly which can derive motion from the film transporting mechanism and is sufficiently simple and inexpensive to warrant its use in motion picture cameras for amateurs, particularly in motion picture cameras which utilize 8-millimeter film stored in factory packed magazines.

An additional object of the invention is to provide an indicator assembly which can be mounted in such a way that the presence or absence of a magazine and the condition of the film transporting mechanism can be detected by looking through the view finder.

A concomitant object of the invention is to provide an indicator assembly which occupies room that is available in a motion picture camera.

The improved camera comprises a housing which can accommodate removable film magazines of the type having a rotary takeup member which collects exposed motion picture film, a film transporting mechanism installed in the housing and operative to rotate the takeup member of a magazine in the housing, a window provided in the housing (preferably in the view finder), and indicating means provided in the housing and operatively connected with the film transporting mechanism to perform reciprocatory or other movements when the mechanism operates to transport the film. The indicator means is displaceable into registry with the window in response to insertion of a magazine into the housing so that the user of the camera knows that a magazine is a accommodated in the housing when the indicator means is observable in the window and that the mechanism transports the film when the indicator means is in motion. Such indicator means may include a strap or a like motion transmitting member which operates the film frame counter of the camera.

The novel features which are considered as characteristic of the invention are set forth in particular in the appended claims. The improved camera itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
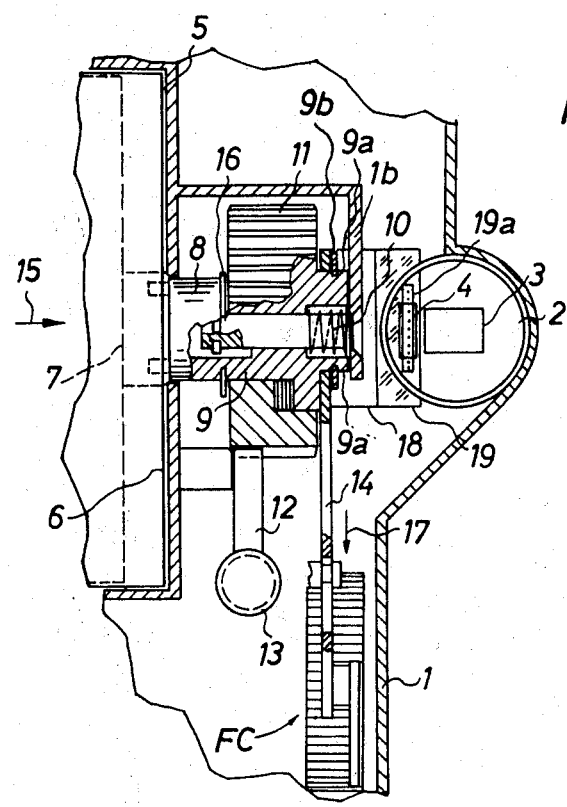
FIG. 1 is a fragmentary transverse vertical sectional view of a motion picture camera which embodies one form of our invention.

FIG. 1 illustrates a portion of a motion picture camera for use with 8-millimeter film. The camera comprises a housing 1 provided with a view finder 2 having a view finder window 3 and a narrow monitoring window 4 which is adjacent to one vertical side of the window 3. The interior of the housing 1 is provided with a chamber 5 adapted to accommodate a removable magazine 6 containing a supply of 8-millimeter film, not shown. The magazine 6 further accommodates a rotary takeup reel having a coupling element 7 which is accessible from the outside and can be engaged and rotated by a second coupling element 8 installed in the housing 1 and forming part of a film transporting mechanism. The coupling element 8 is movable axially and is biased in a direction to the left, as viewed in FIG. 1, by a helical spring 10 one end of which abuts against an internal wall 1b of the housing 1. The film transporting mechanism further comprises a shaft 9 which is coupled to the element 8 by a friction generating member 16, a spur gear 11 which drives the shaft 9, a worm wheel 12 which meshes with the gear 11, a worm 13 which meshes with the wheel 12, and an electric motor or a spring motor (not shown) which drives the form 13. The axial length of the gear 11 is such that it remains in mesh with the worm wheel 12 in all axial positions of the shaft 9 and coupling element 8. The parts 8, 9, 9a 11, 16 constitute an axially movable output portion of the film transporting mechanism.

The shaft 9 comprises an eccentric 9a which serves to transmit motion to a novel indicator assembly and which can also serve to operate a film frame counter FC. When a fresh magazine 6 is inserted into the chamber 5 in the direction indicated by arrow 15, the coupling element 7 on the takeup reel of the magazine 6 shifts the parts 8, 9, 9a, 11, 16 in a direction to the right and the thus shifted parts remain in their new positions as long as the magazine 6 remains in the chamber 5. The coupling element 8 then drives the takeup reel by way of the coupling element 7 as soon as the motor of the film transporting mechanism is started. When the entire film is exposed, i.e., when the entire film is collected by the takeup reel, the coupling element 7 comes to a halt and arrests the coupling element 8. The motor can still drive the shaft 9 because the latter is connected with the coupling element 8 by the friction generating member 16. When the magazine 6 is withdrawn from the chamber 5, the spring 10 expands and returns the output portion of the film transporting mechanism to its starting position in which the coupling element 8 extends into the chamber 5. When the film transporting mechanism advances the film, the eccentric 9a rotates with the shaft 9 and reciprocates a strap 14 of the indicator assembly. This strap has an eye which surrounds the eccentric 9a and is held against axial movement with reference to the shaft 9 by a split ring 9b or the like. When the motor advances the film, the strap 14 reciprocates in and counter to the direction indicated by arrow 17.

In accordance with a feature of our invention, the strap 14 carries a marker including a flag 18 which is rigidly connected thereto and supports a transparent plate 19 having imprinted thereon a symbol 19a constituting a miniature replica of a length of exposed motion picture film. The symbol 19a may be replaced by dots, lines or other indicia. The arrangement is such that the symbol 19a automatically moves into registry with the window 4 in the view finder 2 when the magazine 6 is inserted into the chamber 5 so that, by looking through the view finder, the user of the camera sees the symbol 19a and knows that the housing 1 contains a magazine. The spring 10 displaces the parts 19a, 19, 18, 14, 9b, 9a, 9, 11, 8, 16 in a direction to the left when the magazine 6 is withdrawn and the symbol 19a is then moved away from registry with the window 4. When the magazine 6 is inserted and the film transporting mechanism rotates the takeup reel by way of the coupling element 8, the eccentric 9a reciprocates the strap 14 and hence also the parts 18, 19, 19a so that, by looking through the view finder 2, the user notes that the symbol 19a moves up and down and is thus informed that the film transporting mechanism is in operation. In other words, when the magazine 6 is properly inserted, and when the film transporting mechanism is in motion, the user can see than the camera is loaded and also that the film is being advanced. The width of the symbol 19a preferably approximates that of the window 4.

Figure 2:
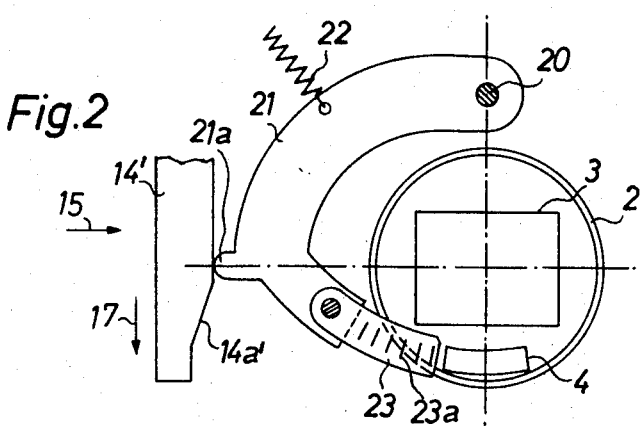
FIG. 2 is an enlarged view of a detail in a modified camera.

FIG. 2 illustrates a modification of the structure shown in FIG. 1. The strap 14 of FIG. 1 is replaced by a strap 14' which can reciprocate in and counter to the direction indicated by arrow 17 and can be shifted in and counter to the direction indicated by arrow 15. The indicator assembly further comprises a cam 14a' on the strap 14' and a marker 21 which resembles a one-armed lever and is pivotable on a pin 20 fixed to the housing of the motion picture camera. The lever 21 has a projection 21a which constitutes a follower and is biased against the face of the cam 14a' by a helical spring 22 which tends to turn the lever 21 in a counterclockwise direction. The free end of the lever 21 carries a transparent plate 23 which is provided with symbols 23a, e.g., a series of lines or the like which move into registry with the window 4 in the view finder 2 when the strap 14' is displaced in the direction indicated by arrow 15, i.e., when a magazine is inserted into the chamber of the housing. If the film transporting mechanism transports the film, the strap 14' moves in and counter to the direction indicated by arrow 17 and its cam 14a' causes the plate 23 to move back and forth with reference to the window 4 so that the user knows that the film is being transported from the supply reel toward and is being convoluted on the takeup reel.

The strap 14' can operate a frame counter in the same way as described in connection with FIG. 1. The position of the follower 21a and cam 14a' can be reversed, i.e., the follower 21a can be provided on the strap 14a'.

It is also possible to replace the lever 21 with a slide (not shown) or a like member which is reciprocably mounted in the housing of the camera and carries one or more symbols which move into registry with the window 4 when the user inserts a magazine. The slide is biased against the cam 14a' by a suitable spring corresponding to the spring 22 and causes its symbol or symbols to move back and forth when the film transporting mechanism is in operation. The slide is preferably reciprocable in a direction at right angles to the direction of travel of the strap 14' (arrow 17).

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is:

1. In a motion picture camera, a combination comprising a housing arranged to accommodate removable film magazines of the type including a rotary takeup member; a film transporting mechanism installed in said housing and operative to rotate the takeup member of a magazine in said housing; a window in said housing; indicator means provided in said housing; means for displacing said indicator means into registry with said window in response to insertion of a magazine into said housing and for maintaining said indicator means in registry with said window continuously while said magazine is in said housing; and means connecting said transporting mechanism with said indicator means for imparting continuous movement to said indicator means during movement of said transporting mechanism.

2. A combination as defined in claim 1, wherein said indicator means is displaceable into registry with said window by a portion of said film transporting mechanism.

3. A combination as defined in claim 1, wherein the magazines contain 8-millimeter film and wherein said window is located in the view finder of the camera.

4. A combination as defined in claim 1, wherein said indicator means includes a marker including a transparent portion provided with a symbol observable in said window in response to insertion of a magazine and arranged to move with reference to the window in response to operation of said mechanism.

5. A combination as defined in claim 4, wherein said symbol is a miniature replica of a length of motion picture film.

6. A combination as defined in claim 1, further comprising film frame counter means installed in said housing and operative to indicate the number of exposed film frames, said indicator means comprising a portion arranged to operate said frame counter means in response to operation of said mechanism.

7. A combination as defined in claim 6, wherein said mechanism comprises a rotary eccentric and said portion of said indicator means comprises a strap cooperating with said eccentric to operate said film frame counter means.

8. In a motion picture camera, a combination comprising a housing arranged to accommodate removable film magazines of the type including a rotary takeup member; a film transporting mechanism installed in said housing and operative to rotate the takeup member of a magazine in said housing, said mechanism comprising a rotary output portion, means for biasing said rotary output portion axially in a first direction and means for moving said rotary output portion axially in a second direction in response to insertion of a magazine into said housing such that said rotary output portion thereupon engages with and transmits torque to the takeup member of the inserted magazine; a window in said housing; and indicator means provided in said housing and operatively connected with said mechanism to perform movements when said mechanism operates to transport the film, said indicator means being displaced into registry with said window in response to movement of said output portion in said second direction so that the user of the camera knows that a magazine is accommodated in said housing when said indicator means is observable in said window and that the mechanism transports the film when said indicator means is in motion.

9. A combination as defined in claim 8, wherein said output portion comprises an eccentric arranged to move said indicator means in response to rotation of said output portion.

10. A combination as defined in claim 9, wherein said indicator means comprises a strap cooperating with said eccentric and marker means receiving motion from said strap.

11. A combination as defined in claim 10, wherein said marker means is rigid with said strap.

12. A combination as defined in claim 9, wherein said indicator means comprises a strap element cooperating with said eccentric and a marker element, one of said elements having a cam and the other element having a follower tracking said cam.

13. A combination as defined in claim 12, wherein said marker element includes a lever which is rockably mounted in said housing and spring means for biasing said lever against said strap element.

14. A combination as defined in claim 12, wherein said marker element comprises a reciprocable member and spring means for biasing said reciprocable member against said strap element.

References Cited

UNITED STATES PATENTS

| | | | |
|---|---|---|---|
| 2,392,212 | 1/1946 | Zuber | 352—171 |
| 2,926,560 | 3/1960 | Coutant | 352—171 |
| 3,120,781 | 2/1964 | Babcock | 352—72 |
| 3,297,397 | 1/1967 | Grant | 352—171 X |
| 3,377,982 | 4/1968 | Katsuyama | 352—171 X |

JOHN M. HORAN, Primary Examiner

M. H. HAYES, Assistant Examiner

U.S. Cl. X.R.

116—114; 352—171